US012730741B2

(12) United States Patent
Zhang

(10) Patent No.: US 12,730,741 B2
(45) Date of Patent: Sep. 8, 2026

(54) SERVICE CONFIGURATION METHOD AND APPARATUS

(71) Applicant: TENCENT CLOUD COMPUTING (BEIJING) CO., LTD, Beijing (CN)

(72) Inventor: Peipei Zhang, Beijing (CN)

(73) Assignee: TENCENT CLOUD COMPUTING (BEIJING) CO., LTD, Beijing (CN)

( * ) Notice: Subject to any disclaimer, the term of this patent is extended or adjusted under 35 U.S.C. 154(b) by 155 days.

(21) Appl. No.: 18/127,478

(22) Filed: Mar. 28, 2023

(65) Prior Publication Data

US 2023/0236954 A1 Jul. 27, 2023

Related U.S. Application Data

(63) Continuation of application No. PCT/CN2021/109359, filed on Jul. 29, 2021.

(30) Foreign Application Priority Data

Jun. 24, 2021 (CN) ......................... 202110715643.4

(51) Int. Cl.
*G06F 9/44* (2018.01)
*G06F 11/3698* (2025.01)

(52) U.S. Cl.
CPC ................................ *G06F 11/3698* (2025.01)

(58) Field of Classification Search
CPC .................................................. G06F 11/3664
See application file for complete search history.

(56) References Cited

U.S. PATENT DOCUMENTS

2009/0013010 A1* 1/2009 Fang ....................... H04L 67/02 707/999.203
2019/0090158 A1* 3/2019 Das ......................... H04L 67/12

FOREIGN PATENT DOCUMENTS

CN 111782520 A 10/2020

OTHER PUBLICATIONS

Office Action received for Chinese Patent Application No. 202110715643.4, mailed on May 1, 2026, 19 pages (9 pages of English Translation and 10 pages of Original Document).

* cited by examiner

*Primary Examiner* — Hang Pan
(74) *Attorney, Agent, or Firm* — ARENTFOX SCHIFF LLP

(57) ABSTRACT

A method of information processing includes obtaining a traffic request for a target service. The traffic request includes a request tag. The method further includes determining a target environment that matches with the request tag and obtaining first deployment information of the target service. The first deployment information of the target service indicates one or more test versions of the target service to be tested, and one or more corresponding environments respectively deployed for the one or more test versions of the target service. The method also includes determining, from the one or more test version, a target test version that is deployed to the target environment and accessing the target service in the target test version in the target environment. Apparatus and non-transitory computer-readable storage medium counterpart embodiments are also contemplated.

20 Claims, 7 Drawing Sheets

Newly create constraint rules

① Basic setting

Environment name: lane-test-rule001

Note: Chinese and English characters are supported, and the length of characters does not exceed 60.

Remark: Test

Next step (a)

Newly create constraint rules

② Request parameter rule setting

Constraint rules

| Tag name | Logical relationship | Tag value | Delete |
| --- | --- | --- | --- |
| aaa | Equal to | 123 | |
| bbb | Not equal to | 456 | |

Rule effective relationship

○ Or (meet any rule) ✓ And (meet all rules at the same time)

Previous step Next step (b)

Newly create constraint rules

③ Release a target environment test001

Note: If there is no suitable environment, newly create an environment now.

Previous step Complete (c)

FIG. 6

SERVICE CONFIGURATION METHOD AND APPARATUS

RELATED APPLICATIONS

The present application is a continuation of International Application No. PCT/CN2021/109359, entitled "INFORMATION PROCESSING METHOD AND APPARATUS, AND COMPUTER DEVICE AND STORAGE MEDIUM" and filed on Jul. 29, 2021, which claims priority to Chinese Patent Application No. 202110715643.4, entitled "INFORMATION PROCESSING METHOD AND APPARATUS, COMPUTER DEVICE, AND STORAGE MEDIUM" and filed on Jun. 24, 2021. The entire disclosures of the prior applications are hereby incorporated by reference in their entirety.

FIELD OF THE TECHNOLOGY

This application relates to the field of Internet technologies, including an information processing method and apparatus, a computer device, and a storage medium.

BACKGROUND OF THE DISCLOSURE

Grayscale release refers to a release mode that can achieve smooth transition between black and white.

With the idea of grayscale release, grayscale testing (or called AB testing) may be performed on a product, where the grayscale testing means that after one or more services of the product that have been launched are updated, in order to test the performance of the updated services in the product, some users can continue to use product features A (services before updating), and some users start to use product features B (services after updating). During grayscale testing at present, it is necessary to configure rules for each service involved in the full link related to the product. If the services involved in the full link include a service 1, a service 2 and a service 3, developers need to configure rules for the service 1, the service 2 and the service 3 respectively before the grayscale testing.

It can be seen that the current grayscale testing mode has a problem of lower flexibility.

SUMMARY

Embodiments of this disclosure provide an information processing method and apparatus, a computer device, and a storage medium, which can increase the flexibility of service testing.

Some aspects of the disclosure provide a method for information processing. The method includes obtaining a traffic request for a target service, the traffic request includes a request tag. The method further includes determining a target environment that matches with the request tag and obtaining first deployment information of the target service. The first deployment information of the target service indicates one or more test versions of the target service to be tested, and one or more corresponding environments respectively deployed for the one or more test versions of the target service. The method also includes determining, from the one or more test version, a target test version that is deployed to the target environment and accessing the target service in the target test version in the target environment.

Some aspects of the disclosure provide an apparatus for information processing. The apparatus includes processing circuitry configured to obtain a traffic request for a target service, the traffic request includes a request tag. The processing circuitry is further configured to determine a target environment that matches with the request tag and obtain first deployment information of the target service. The first deployment information of the target service is used for indicating one or more test versions of the target service to be tested, and one or more corresponding environments respectively deployed for the one or more test versions of the target service. The processing circuitry is also configured to determine, from one or more test version, a target test version that is deployed to the target environment, and access the target service in the target test version in the target environment.

Some aspects of the disclosure provide a non-transitory computer-readable storage medium storing instructions which when executed by at least one processor cause the at least one processor to perform the method for information processing.

The technical solutions provided in the embodiments of this disclosure may have the following beneficial effects:

after a traffic request for a target service is obtained, a target environment matched with a request tag carried by the traffic request is determined; and based on deployment information of the target service, a target test version that is deployed to the target environment in the versions to be tested of the target service is determined, so as to access the target service in the target test version in the target environment. In the embodiments of this disclosure, by deploying the versions to be tested of the target service to different environments, isolation and non-interference between different versions to be tested are realized due to mutual isolation of different environments, this disclosure may flexibly adapt to various complex and complicated grayscale release scenes in different versions to be tested for services, the configuration of services during grayscale testing is effectively avoided, and the efficiency of grayscale testing is increased. In addition, the embodiments of this disclosure may also uniformly manage traffic requests based on request tags, and may flexibly route the traffic requests to different environments, so as to further increase the efficiency of grayscale testing.

BRIEF DESCRIPTION OF THE DRAWINGS

To describe the technical solutions of the embodiments of this disclosure more clearly, the following briefly introduces the accompanying drawings required for describing the embodiments.

FIG. 5 is a schematic scene diagram of environment creation provided in an embodiment of this disclosure.

FIG. 6 is a schematic interface diagram of a rule configuration interface provided in an embodiment of this disclosure.

DESCRIPTION OF EMBODIMENTS

Figure 1:
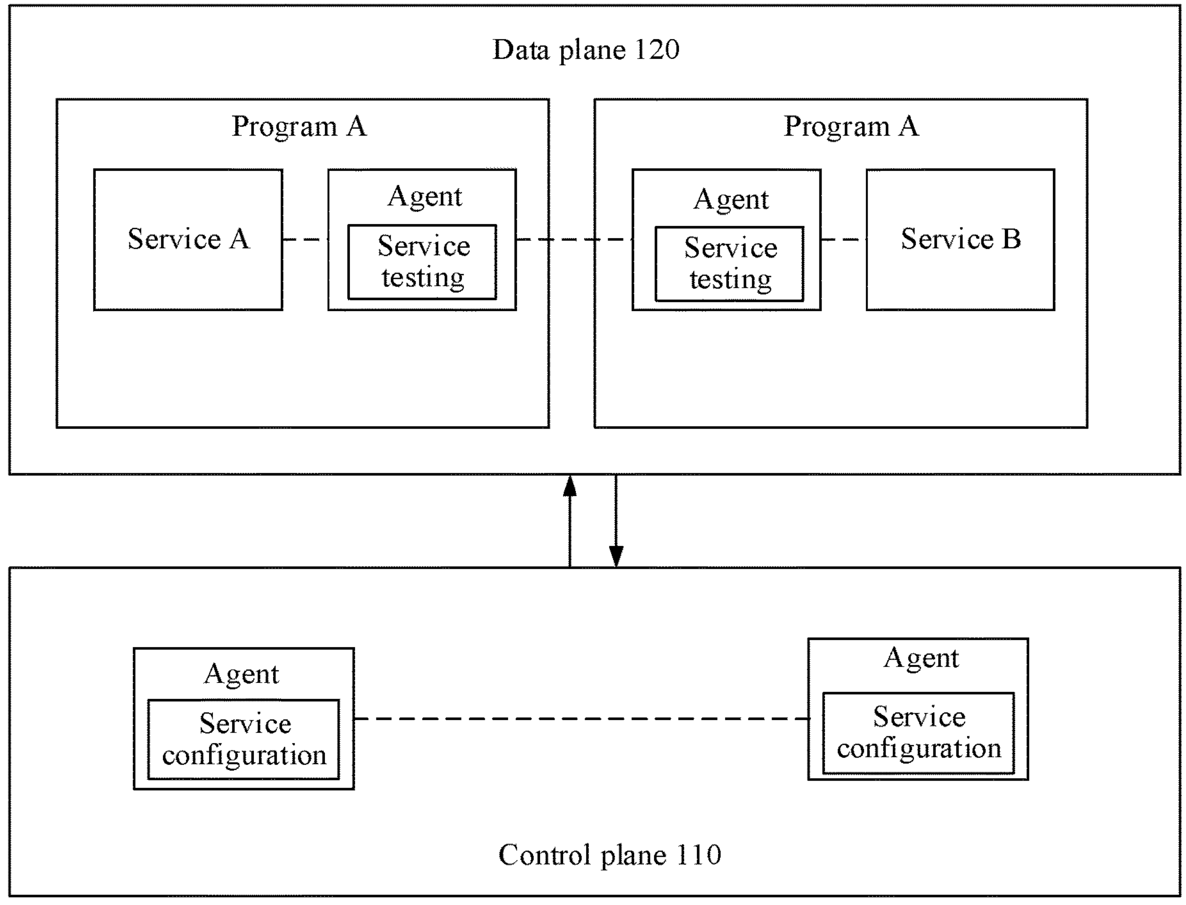
FIG. 1 is a schematic architectural diagram of a data processing system provided in an embodiment of this disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this disclosure. On the contrary, the implementations are merely examples of apparatuses and methods that are consistent with some aspects of this disclosure.

An embodiment of this disclosure provides an information processing solution which can be used for full-link grayscale release in a Service Mesh. A full link refers to a link composed of all services that need to be accessed by a traffic request. For example, a link composed of all services that need to be accessed by a traffic request is: service 1->service 2->service 3. This link is a full link which may realize the global routing of the Service Mesh. It is to be understood that this disclosure illustrates the routing between any two services. It can be understood that any one or more services in the Service Mesh may refer to the execution processes of the information processing method in this disclosure, so as to realize the global routing in the Service Mesh. In an example, the Service Mesh includes a control plane and a data plane. The technical solution provided in the embodiment of this disclosure mainly has the following characteristics:

(1) A control plane and a data plane for full-link grayscale release are redesigned, configuration modes of constraint rules, environments, grayscale release, and the like are introduced on the control plane, and the data plane synchronizes the constraint rules configured on the control plane.

① The configuration on the control plane mainly includes the following steps: firstly, an environment is created on the control plane, a deployment group of a specific version that needs grayscale release is added to the same environment, and one or more deployment groups are specified in the environment as environment portals; and secondly, constraint rules are created on the control plane, the grayscale traffic of the environment portal is matched by setting request parameters, and the constraint rules are released to the target environment to realize the association between the portal rules and the environment.

② The data plane synchronizes the constraint rules set by the control plane in real time, and the specific logic of full-link grayscale release is realized by an extension mechanism of the Service Mesh.

(2) The constraint rules of the full link are configured by the unified control plane, and only the constraint rules and environment of the portal flow need to be configured, so that the operating cost is low and the consistency is high.

(3) The header of the grayscale traffic identified by the portal service does not need to be self-maintained. After matching the constraint rules at the portal of the deployment group, the data plane will automatically generate and maintain a globally unique environment identity (ID) and transfer the environment ID to downstream services. Different environments have respective unique environment IDs to avoid the confusion of grayscale traffics in different environments.

(4) The data plane preferentially matches the full-link constraint rules (or called global routing rules) which may not be covered by other common routing rules.

(5) When the verification of full-link grayscale release is successful and a business system is restored or completely upgraded, the control plane may delete or update a full-link grayscale release mode by the constraint rules with one click, which is low in operating cost and is not easy to make mistakes.

The technical solutions provided in this disclosure are introduced below with reference to some embodiments.

First, the technical terms involved in the embodiments of this disclosure are introduced.

Service Mesh: It is an infrastructure layer for handling communication between services. The Service Mesh is responsible for forming a complex service topology of modern cloud native applications to reliably deliver requests. In some examples, the Service Mesh is implemented as a lightweight network agent (called Sidecar) array, these agents are deployed together with application codes, and the applications do not need to be aware of the existence of the agents.

sidecar: It is an independent process separated from a main application process and loosely coupled with the main application process, and may be considered as an agent. The sidecar may shield the differences of different programming languages, and uniformly realize the functions of microservices such as observability, routing, full-link grayscale, authentication, traffic limiting and fuses.

Deployment group: It is a logical concept of implementing application batch deployment. A deployment group includes multiple application examples, and the same application runs on the multiple application examples.

Environment: The environment is a set of deployment groups and is a destination of grayscale release (global routing) rules. The deployment groups in the environment belong to different applications. It can be considered that a user divides a grayscale environment by dividing the environment.

Grayscale release: It is a common launching mode during software launching. It means that during release, a traffic with certain features or proportions is allocated to the version to be verified, so as to observe the online running status of a new verified version.

Grayscale release rules: A user configures the conditions that a request needs to meet on grayscale release rules. When the request meets certain conditions, the traffic may be routed to a certain environment according to the grayscale release rules.

FIG. 1 is a schematic architectural diagram of an information processing system provided in an embodiment of this disclosure. The architectural diagram of the information processing system may include: a control plane 110 and a data plane 120.

In an example, the control plane 110 and the data plane 120 are respectively implemented as a computer device. In another example, the control plane 110 and the data plane 120 are integrated into a same computer device. In some examples, computer devices include: terminal devices such as vehicle-mounted devices, smart phones, tablet personal computers and smart wearable devices, servers, and the like. The control plane 110 directly or indirectly communicates with the data plane 120 in a wired communication mode or a wireless communication mode, and the communication mode is not limited in this disclosure.

In the embodiments of this disclosure, the information processing system may be a Service Mesh or a microservice framework system, where the microservice framework system includes but is not limited to: Spring Cloud (a distributed microservice system), Dubbo (a high-performance lightweight service system), Thrift (a microservice system based on remote procedure call), grpc (a microservice system with strict interface constraints), or the like.

In this disclosure, for example, the control plane 110 and the data plane 120 are respectively implemented as a computer device, where each agent included in the control plane 110 is used for service-associated configuration (that is, service configuration), such as configuration of environments, and configuration of environment-associated constraint rules; and each agent included in the data plane 120 is used for service discovery, and the service discovery is used for instructing service testing or grayscale testing according to the environment synchronized from the control plane 110 and environment-associated constraint rules. In addition, a service A and a service B in the data plane 120 may be different services in a same application program or different services in different application programs.

In an example, the information processing method provided in the embodiments of this disclosure is combined with the blockchain technology. For example, a constraint rule set, deployment information of services, and the like may be uploaded to a blockchain for storage to ensure that the data on the blockchain is not easily tampered. Blockchain is a new application mode of distributed data storage, point-to-point transmission, consensus mechanism, encryption algorithm and other computer technologies.

In an example, devices involved in the information processing system provided in the embodiments of this disclosure are deployed in a blockchain network and used as node devices in the blockchain network. For example, the control plane 110 and the data plane 120 are both taken as node devices in the blockchain network to together form the blockchain network. Based on this, relevant procedures of information processing for traffic requests in this disclosure may be performed on the blockchain, which not only ensures the justice and equity of the information processing procedures, but also makes the information processing procedures traceable and improves the security of the information processing procedures.

In an example, the blockchain involves a large number of data computing and data storage services, and a large number of data computing and data storage services need to spend a lot of computer operating costs, so the constraint rule set and deployment information of services involved in this disclosure are implemented by the cloud storage technology in cloud technologies. That is, the blockchain is stored on the "cloud" by the cloud storage technology; in a case that data such as the constraint rule set and deployment information of services need to be stored in the blockchain, these data are uploaded to the blockchain on the "cloud" by the cloud storage technology; and in a case that these data need to be read, the data may be read from the blockchain on the "cloud" at any time. By the cloud storage technology, storage requirements for terminal devices are reduced, and the disclosure scope of the blockchain is expanded.

Cloud storage is a new concept extended and developed from the concept of cloud computing. A distributed cloud storage system (hereinafter referred to as storage system) refers to a storage system that integrates a large number of different types of storage devices (storage devices are also referred to as storage nodes) in the network through application software or application interfaces to work together and jointly provide data storage and business access functions by cluster applications, grid technologies, distributed storage file systems and other functions.

In an example, the information processing method provided in the embodiments of this disclosure is performed by the agent in the data plane 120. In some examples, the agent in the data plane 120 performs the information processing method provided in the embodiments of this disclosure after synchronizing the constraint rules configured by a user on the control plane 110. Exemplarily, the agent in the data plane 120 obtains a traffic request for a target service (such as service B), and determines a target environment matched with the request tag based on a request tag carried by the traffic request, where the target service includes a service version that has been tested; the agent in the data plane 120 obtains deployment information of the target service, where the deployment information of the target service is used for indicating at least one of the following information: whether the target service has versions to be tested, whether the versions to be tested are deployed to corresponding environments, and environment IDs corresponding to environments; and the agent in the data plane 120 determines a target test version that is deployed to the target environment in the versions to be tested of the target service based on the deployment information, and accesses the target service in the target test version in the target environment.

It is to be understood that the system architecture diagram described in the embodiments of this disclosure is intended to more clearly describe the technical solutions in the embodiments of this disclosure, and does not constitute a limitation on the technical solutions provided in the embodiments of this disclosure. Those skilled in the art may learn that with the evolution of system architectures and the occurrence of new service scenes, the technical solutions provided in the embodiments of this disclosure are also applicable to similar technical problems.

Figure 2:
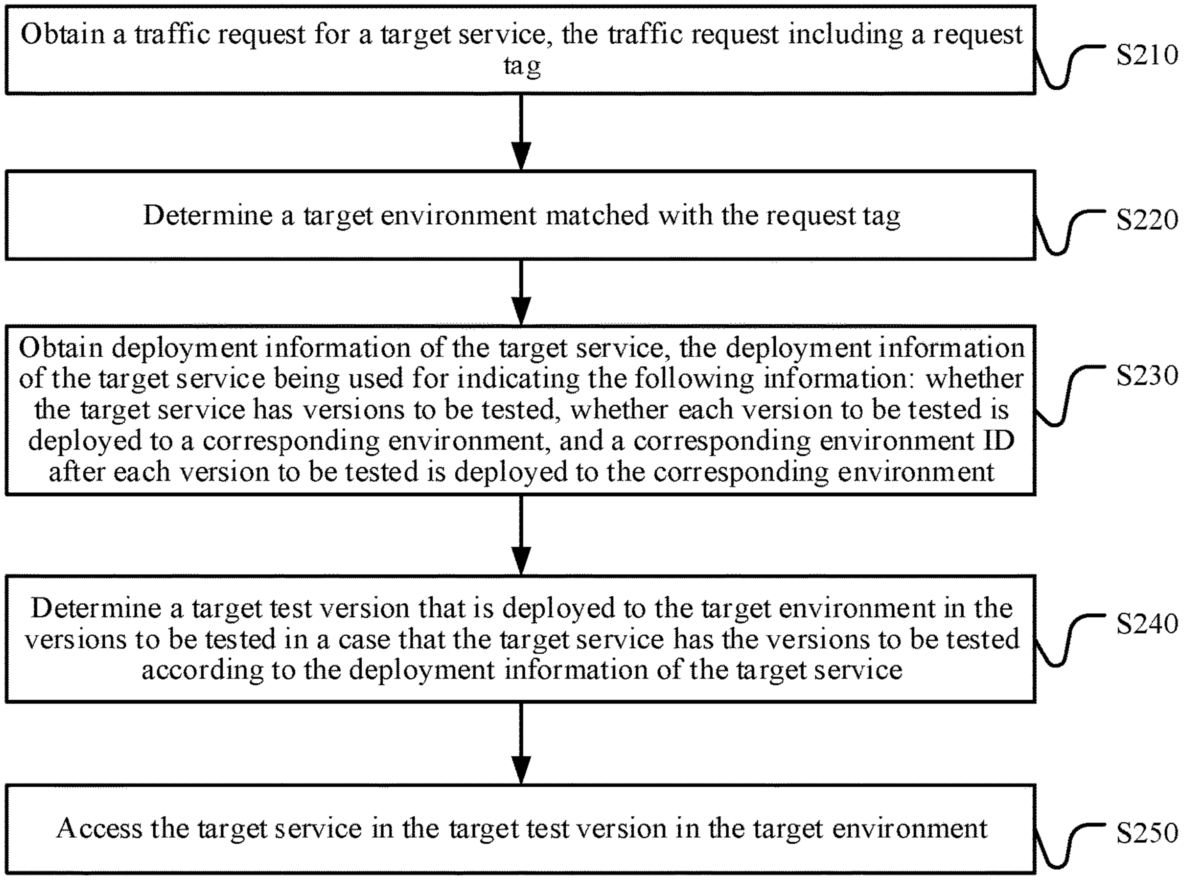
FIG. 2 is a schematic flowchart of an information processing method provided in an embodiment of this disclosure.

FIG. 2 is a schematic flowchart of an information processing method provided in an embodiment of this disclosure. The information processing method may be applied to a computer device. In some examples, the computer device is a device corresponding to a data plane 120 in the information processing system shown in FIG. 1, such as an agent device corresponding to the data plane 120. As shown in FIG. 2, the information processing method provided in the embodiment of this disclosure includes step S210 to step S250.

At step S210, a traffic request for a target service is obtained, the traffic request includes a request tag.

The information processing method provided in the embodiment of this disclosure may be applied to a grayscale release scene. In other words, in the process of application or program release, traffics with certain features or proportions may be allocated to a new service version to be tested by the information processing method provided in the embodiment of this disclosure, so as to observe an online running status of the new service version to realize the reliable release of the new service version of the application. In the following embodiments, one traffic request is taken as an example for description. It is to be understood that this disclosure is also applicable to any one of a batch or a large number of traffic requests, where each traffic request in a batch of traffic requests executes the technical solutions provided in the embodiments of this disclosure in parallel, or executes the technical solutions provided in the embodiments of this disclosure in the order of receiving traffic requests (in series), which is not limited in this disclosure.

A data plane obtains a traffic request for a target service. The target service refers to a downstream service to be accessed by the traffic request initiated by a user, the downstream service refers to a service to be accessed after the current service, and the current service refers to a service currently accessed by the traffic request. For example, the current service is a service A, downstream services of the service A include: a service B, a service C, a service D, a service E, a service F, and the like, and thus, the target service is the service B.

In an example, the target service has a service version that has been tested, thereby ensuring that when the traffic request may not successfully access the target service in a version to be tested (service version to be tested), the traffic request may access the target service in the service version that has been tested. In other words, the target service in the service version that has been tested is used for ensuring the routability of the traffic request when the traffic request may not successfully access the target service in the service version to be tested. The routability means that the traffic request may not be terminated when arriving and may continue to access services.

In the embodiments of this disclosure, the traffic request carries a request tag. In some examples, the request tag includes but is not limited to: at least one tag name, a tag value corresponding to each tag name, and a logical relationship between the tag name and the corresponding tag value. In some examples, the logical relationship between the tag name and the corresponding tag value includes but is not limited to: equal to, not equal to, including, not including, regular expression, and the like. Exemplarily, if the logical relationship between the tag name and the corresponding tag value is including, the tag name includes the corresponding tag value.

At step S220, a target environment matched with the request tag is determined.

The environment may be a gathering place including target services in one or more versions to be tested. In some examples, in the embodiments of this disclosure, different environments are isolated from each other, that is, there is no interaction or communication between an environment A and an environment B. In some examples, the environment corresponds to an environment ID to uniquely identify the environment.

Based on the request tag carried by the traffic request, the data plane may determine the target environment matched with the request tag. In an example, the request tag includes but is not limited to: at least one tag name, a tag value corresponding to each tag name, and a logical relationship between the tag name and the corresponding tag value. Based on this, in some examples, the matching with the request tag includes: matching with at least one tag name in the request tag, a tag value corresponding to the at least one tag name, and a logical relationship between each tag name and the corresponding tag value.

A mode of determining the target environment is not limited in the embodiments of this disclosure. In an example, an association relationship is established in advance between the request tag and the target environment, and after the data plane obtains the request tag, the associated target environment may be obtained based on the request tag. In another example, the data plane obtains an environment ID matched with the content of the request tag based on the content of the request tag, and the environment corresponding to the environment ID is the target environment. In a further example, an environment ID corresponding to the environment may be computed according to the request tag, after the data plane obtains the request tag, the environment ID is computed based on the request tag, and the environment corresponding to the computed environment ID is the target environment. A mode of determining the target environment is introduced below.

In an example, step S220 includes step S222 to step S226.

At step S222, a constraint rule set is obtained.

The constraint rule set includes at least one constraint rule, where a constraint rule is associated with an environment. In some examples, there is a one-to-one relationship between constraint rules and environments, that is, a constraint rule is associated with an environment, and an environment is associated with a constraint rule; alternatively, there is a many-to-one relationship between constraint rules and environments, that is, a constraint rule is associated with an environment, and an environment is associated with one or more constraint rules.

The embodiments of this disclosure realize the policy control between multiple constraint rules and multiple environments through the association between constraint rules and environments; and multiple non-interfering different environments are isolated according to constraint rules, so as to flexibly adapt to various complex grayscale release scenes.

At step S224, the target constraint rule matched with the request tag is determined in at least one constraint rule.

The constraint rule set includes at least one constraint rule, and the data plane determines the target constraint rule matched with the request tag from the at least one constraint rule in the constraint rule set based on the request tag of the traffic request.

In some examples, multiple constraint rules are matched with the request tag in the at least one constraint rule. In this case, the data plane may obtain the priorities corresponding to the multiple constraint rules (where the priority corresponding to each constraint rule may be configured by the control plane and synchronized to the data plane), and then, the constraint rule corresponding to the highest priority in the priorities corresponding to the multiple constraint rules is determined as the target constraint rule. In other words, in a case that the request tag is matched with multiple constraint rules, the target constraint rule is determined according to the priorities of the constraint rules.

At step S226, the environment associated with the target constraint rule is taken as the target environment.

A constraint rule is associated with an environment, so in a case that the target constraint rule matched with the request tag is determined, the environment associated with the target constraint rule may be taken as the target environment matched with the request tag.

In some examples, after the target environment matched with the request tag is determined, environment description information may be added to the traffic request, and the environment description information is used for indicating the target environment. In some examples, the environment description information includes an environment ID corresponding to the target environment. In this way, the traffic request may be marked to ensure that the traffic request may only be routed in the target environment and may not flow into other environments, thereby realizing the isolation between different environments, effectively avoiding the confusion of traffic requests in different environments, and facilitating the subsequent traffic tracing.

In an example, step S221 to step S223 are further included before step S224.

At step S221, deployment information of the current service is determined.

The current service refers to a service currently accessed by the traffic request. In some examples, the deployment information of the current service includes but is not limited to: a namespace type, a namespace, an application ID, a deployment group, and the like.

At step S223, whether the current service is a portal service is determined based on the deployment information of the current service.

The portal service is synchronized by the data plane from the control plane of the Service Mesh. In some examples, the deployment information of the portal service includes but is not limited to: a namespace type, a namespace, an application ID, a deployment group, and the like.

Based on the introduction of the deployment information of the current service and the deployment information of the portal service, whether the current service is a portal service is determined based on the deployment information of the current service, including: whether the current service is a portal service is determined based on one or more information in the namespace type, the namespace, the application ID, and the deployment group.

In a case that the current service is determined to be a portal service based on step S223, step S224 is performed, that is, the step of determining the target constraint rule matched with the request tag in the at least one constraint rule is performed.

If it is determined that the current service is not a portal service based on step S223, In some examples, the data plane obtains environment description information from the traffic request, and the environment description information is added after the environment matched with the request tag carried by the traffic request is determined; and then, the data plane routes the traffic request based on the obtained result of the environment description information. In some examples, the obtained result of the environment description information includes: the environment description information is obtained, or the environment description information is not obtained. Based on this, in a case that the environment description information is obtained, the traffic request is routed, including: the environment indicated by the environment description information is taken as the target environment. In a case that the environment description information is not obtained, it means that the target service does not have a version to be tested or any version to be tested of the target service is not deployed to the target environment (deployed to other environments except the target environment), so as to route the traffic request, including: the target service in the service version that has been tested is accessed.

At step S230, deployment information of the target service is obtained, the deployment information of the target service is used for indicating the following information: whether the target service has versions to be tested, whether each version to be tested is deployed to a corresponding environment, and a corresponding environment ID after each version to be tested is deployed to the corresponding environment.

In the embodiments of this disclosure, the target service has multiple service versions, and the multiple service versions include at least a service version that has been tested, and may further include at least one service version to be tested (also called the version to be tested in the embodiments of this disclosure). In some examples, the control plane may deploy some or all of the versions to be tested in the target service to the corresponding environments. In some examples, only one version to be tested of the target service may be deployed in an environment.

Figure 3:
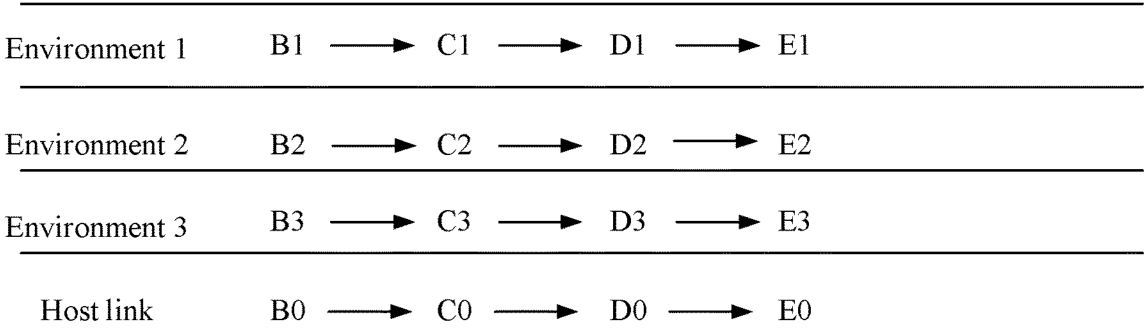
FIG. 3 is a schematic scene diagram of a deployment environment provided in an embodiment of this disclosure.

FIG. 3 is a schematic scene diagram of a deployment environment provided in an embodiment of this disclosure. As shown in FIG. 3, assuming that the target service is a service B, the service B has three versions to be tested, namely B1, B2 and B3, and the B1, B2 and B3 are respectively deployed to an environment 1, an environment 2 and an environment 3. A service version that has been tested of the service B may be B0, and the B0 is deployed in a host link. The environment 1, the environment 2 and the environment 3 are isolated from each other, and the host link is not deployed in any environment.

Since different environments correspond to different environment IDs, after different versions to be tested are deployed to the corresponding environments, the corresponding environment IDs are also different. For example, the target service is a service B, the service B has two versions to be tested: a version V1 to be tested and a version V2 to be tested, the version V1 to be tested may be deployed to an environment 1, and the version V2 to be tested may be deployed to an environment 2, where an environment ID corresponding to the environment 1 is different from an environment ID corresponding to the environment 2.

The data plane may obtain deployment information of the target service, and the deployment information of the target service is used for indicating the following information: whether the target service has versions to be tested, whether the versions to be tested are deployed to corresponding environments, and environment IDs corresponding to environments. It is to be understood that in a case that the target service does not have a version to be tested, the deployment information of the target service is used for indicating: the target service does not have a version to be tested; in a case that the target service has versions to be tested and the versions to be tested are not deployed to corresponding environments, the deployment information of the target service is used for indicating: the target service has versions to be tested, and the versions to be tested are not deployed to corresponding environments; and in a case that the target service has versions to be tested and the versions to be tested are deployed to corresponding environments, the deployment information of the target service is used for indicating: the target service has versions to be tested, the versions to be tested are deployed to corresponding environments, and environment IDs corresponding to environments to which the versions to be tested are deployed.

At step S240, a target test version is determined, the target test version is deployed to the target environment in the versions to be tested in a case that the target service has the versions to be tested according to the deployment information of the target service.

Since in a case that the target service has versions to be tested, the deployment information of the target service is used for indicating: the target service has versions to be tested, whether the versions to be tested are deployed to corresponding environments, and an environment ID corresponding to each environment, based on the deployment information of the target service, whether each version to be tested is deployed to the corresponding environment may be obtained, and if the version to be tested is deployed to the corresponding environment, the environment to which the version to be tested is deployed may be further determined.

In the embodiments of this disclosure, the data plane determines the target environment matched with the traffic request in step S220; and obtains the deployment information of the target service in step S230. Based on this, in a case that the target service has versions to be tested, the data plane may determine the version to be tested that is deployed to the target environment (that is, the target test version) in the versions to be tested of the target service based on the deployment information of the target service.

In an example, assuming that the deployment information of the target service is used for indicating: the target service has versions to be tested, and the versions to be tested are not deployed to corresponding environments, the version to be tested deployed to the target environment in the versions to be tested is determined, including: target environment information matched with the environment ID corresponding to the target environment is determined based on the deployment information of the target service in the version to be tested; and the version to be tested corresponding to the target deployment information is taken as a target version to be tested. A version to be tested is deployed to an environment, and the deployment information of the target service in the version to be tested includes: an environment ID corresponding to the environment to which the version to be tested is deployed. Based on this, the deployment information of target services in different versions to be tested includes different environment IDs.

Exemplarily, the target service is a service B, and the service B has two versions to be tested: a version V1 to be tested and a version V2 to be tested. Based on the deployment information of the service B, it can be determined that the version V1 to be tested is deployed to an environment 1, and the version V2 to be tested is deployed to an environment 2. Assuming that an environment ID corresponding to the environment 1 is test001 and an environment ID corresponding to the environment 2 is test002, the deployment information of the service B in the version V1 to be tested includes test001, and the deployment information of the service B in the version V2 to be tested includes test002. Assuming that the environment ID corresponding to the target environment is test001, since the deployment information of the service B in the version V1 to be tested includes test001, the target deployment information matched with the environment ID corresponding to the target environment is the deployment information of the service B in the version V1 to be tested, and the version to be tested corresponding to the target deployment information (target version to be tested) is the version V1 to be tested.

At step S250, the target service in the target test version in the target environment is accessed.

After obtaining the target test version based on step S240, the data plane may access the target service in the target test version in the target environment, so as to achieve the purpose of grayscale release.

Of course, in some examples, the version to be tested of the target service is not necessarily deployed to the target environment, or the target environment does not necessarily have a version to be tested of the target service. For example, the version to be tested of the target service is deployed to other environments except the target environment; alternatively, the version to be tested of the target service is not deployed to any environment. At this time, the data plane may not access the target service in the target environment. In order to ensure the routability of the traffic request, an embodiment of this disclosure provides a mode of accessing the target service for this case, as shown below.

In an example, in a case that any version to be tested of the target service is deployed to other environments except the target environment (not deployed to the target environment), the target service in the service version that has been tested is accessed. Exemplarily, the target service is a service B, and the service B has two versions to be tested: a version V1 to be tested and a version V2 to be tested, and has a service version V0 that has been tested. Assuming that the target environment is an environment 1 and the two versions to be tested of the service B are respectively deployed to other environments except the environment 1, such as an environment 2 and an environment 3, the service B in the version V1 to be tested and the version V2 to be tested may not be accessed in the target environment (environment 1), but the service B in the service version V0 that has been tested is accessed. In another example, in a case that any version to be tested of the target service is not deployed to any environment, the target service in the version to be tested is accessed.

Of course, in some other examples, the target service may not have any version to be tested, but only the service version that has been tested. At this time, in order to ensure the routability of the traffic request, the data plane accesses the target service in the service version that has been tested.

In conclusion, according to the technical solutions provided in the embodiments of this disclosure, after a traffic request for a target service is obtained, a target environment matched with a request tag carried by the traffic request is determined; and based on deployment information of the target service, a target test version that is deployed to the target environment in the versions to be tested of the target service is determined, so as to access the target service in the target test version in the target environment. In the embodiments of this disclosure, by deploying the versions to be tested of the target service to different environments, isolation and non-interference between different versions to be tested are realized due to mutual isolation of different environments, this disclosure may flexibly adapt to various complex and complicated grayscale release scenes in different versions to be tested for services, the configuration of services during grayscale testing is effectively avoided, and the efficiency of grayscale testing is increased. In addition, the embodiments of this disclosure may also uniformly manage traffic requests based on request tags, and may flexibly route the traffic requests to different environments, so as to further increase the efficiency and flexibility of grayscale testing.

Figure 4:
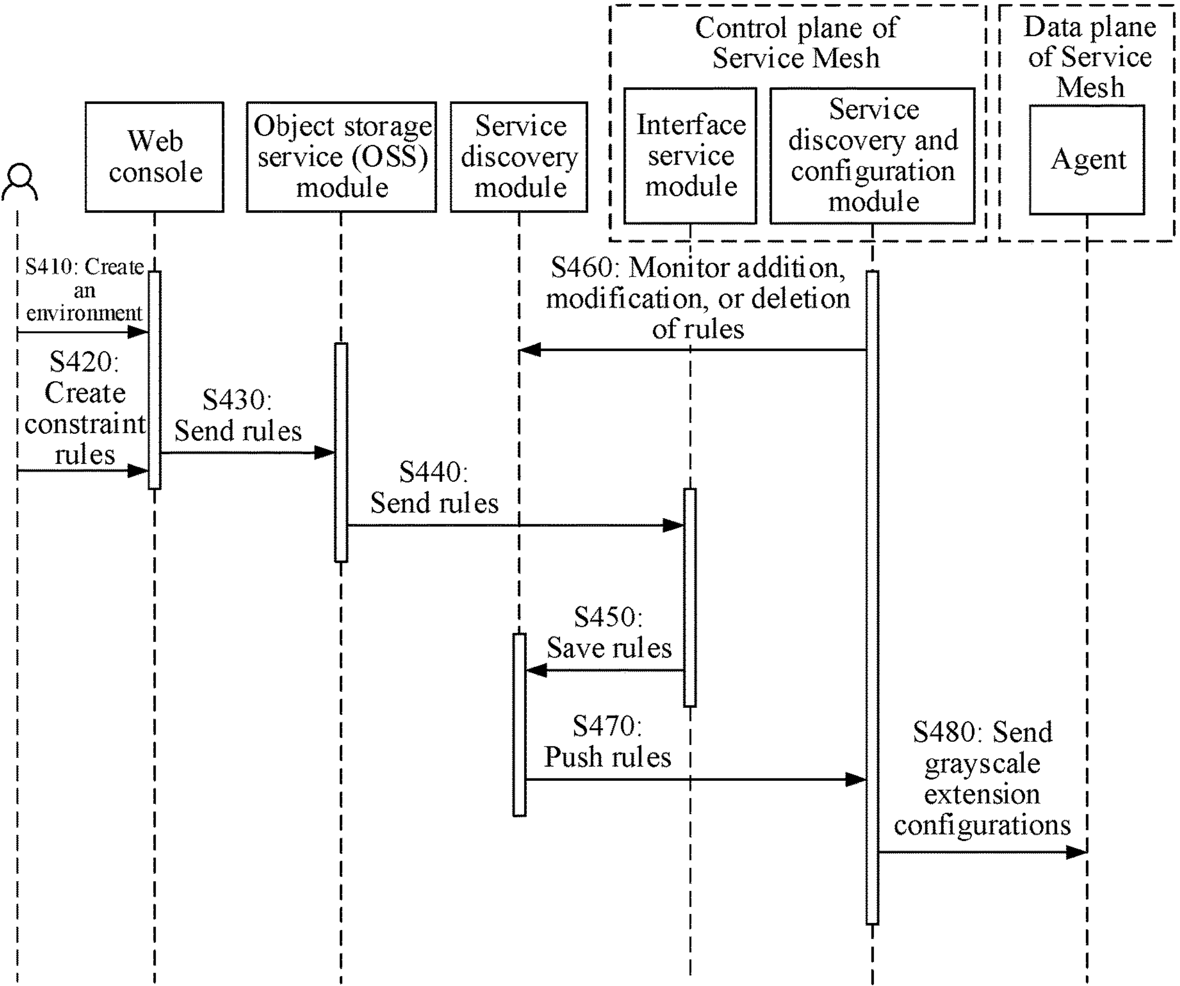
FIG. 4 is a schematic flowchart of sending constraint rules provided in an embodiment of this disclosure.

FIG. 4 is a schematic flowchart of sending constraint rules provided in an embodiment of this disclosure. The embodiment of this disclosure describes an exemplary process of generating any constraint rule in a constraint rule set on a control plane of a Service Mesh, and the process of synchronizing the generated constraint rule to a data plane of the Service Mesh. The embodiment of this disclosure may be applied to a full-link grayscale release scene in the Service Mesh. As shown in FIG. 4, the schematic flowchart may include step S410 to step S480.

At step S410, an environment is created.

Before the use of full-link grayscale release, an environment needs to be configured first. The environment includes a deployment group that needs grayscale testing in the application. A user may create an environment through a Web console. In addition, creating an environment includes but is not limited to: configuring environment-associated basic information (such as an environment name and an environment ID) and selecting a corresponding deployment group.

Figure 5:
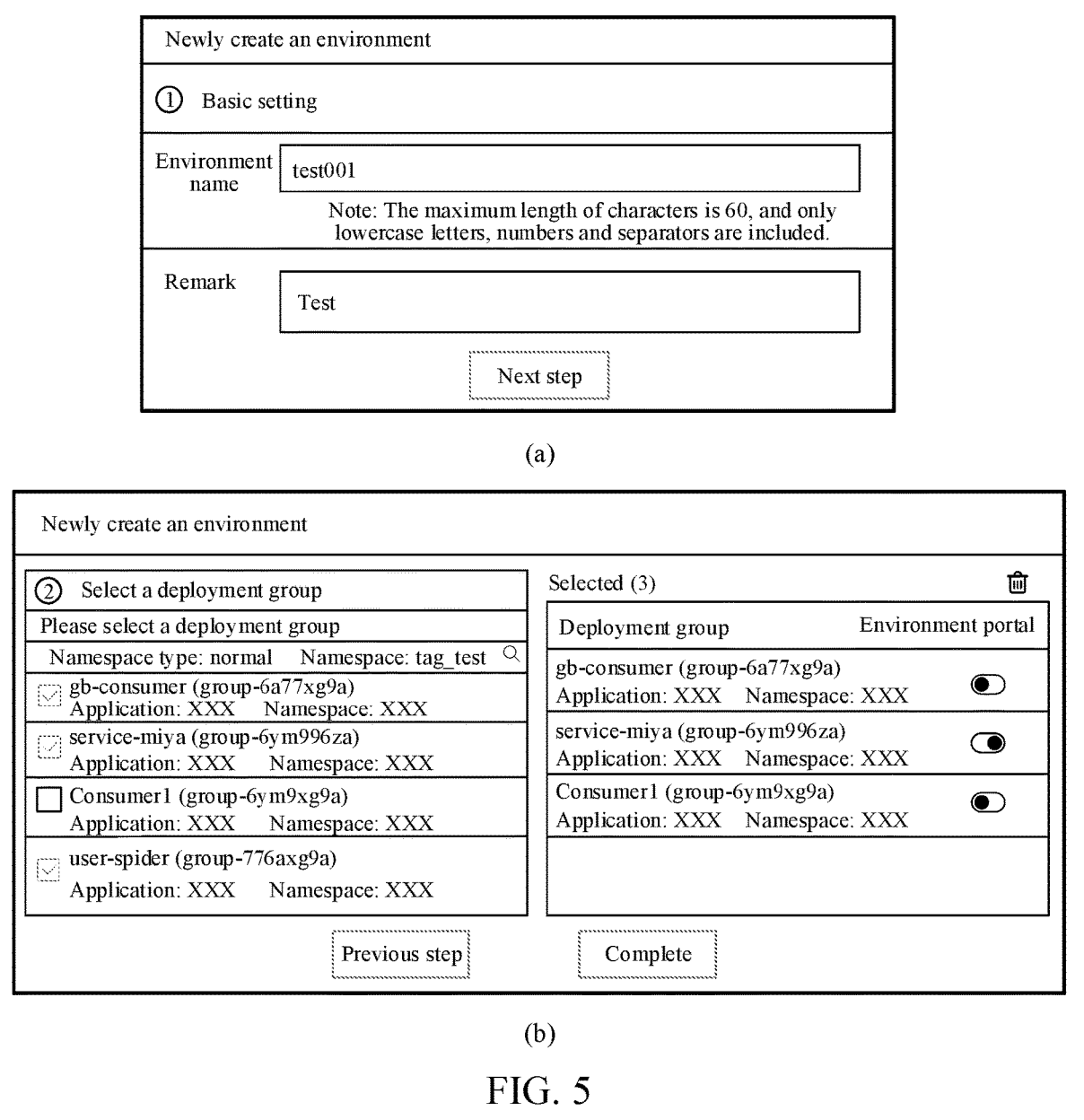

FIG. 5 is a schematic scene diagram of environment creation provided in an embodiment of this disclosure. As shown in FIG. 5(*a*), an environment name created by a user may be "test001", and the created environment name needs to meet specific conditions, for example: the maximum length of characters is 60, and only lowercase letters, numbers and separators are included. Of course, the specific conditions that the environment name needs to meet may also be changed or set. For example, an administrator may change the specific conditions to: the maximum length of characters is 30, only uppercase letters, numbers and separators are included, and the like. Further, relevant remarks may be made, and the remarks may be used for indicating the purpose or function of the created environment. For example, the remark may be "Test".

After the environment is created, a deployment group that needs grayscale release may be selected to join the environment, and an environment portal (that is, a portal service) is set. As shown in FIG. 5(*b*), during selection of the corresponding deployment group, the user may select the corresponding deployment group according to the namespace, namespace type and the like of the deployment group. For example, if the user needs to perform grayscale release of a version 1 of a service 1, the user may find a deployment group associated with the service 1, and then, the deployment group of the version 1 of the service 1 is added to the environment. In addition, after the deployment group that needs grayscale release is added to the environment, an environment portal may be set for the environment. Generally, the environment portal is a gateway used for verifying a traffic request that wants to enter the environment so as to judge whether the traffic request needs to enter the environment. Multiple environment portals are supported in the same environment. When a request passes through each portal deployment group, whether the request needs to enter the environment is judged. A method for configuring an environment portal includes: one or more deployment groups are randomly selected from the deployment groups added to the environment as portal deployment groups.

At step S420, constraint rules are created.

The data plane of the Service Mesh may synchronize a constraint rule set from the control plane of the Service Mesh, where the constraint rule set includes at least one constraint rule, and a constraint rule is associated with an environment. Based on this, after any constraint rule in the constraint rule set is configured by the user on the control plane of the Service Mesh, the data plane of the Service Mesh synchronizes the constraint rule based on configuration of the user on the control plane.

When the user configures any constraint rule by the Service Mesh, the Service Mesh may first display a rule configuration interface by a display device, and generate the corresponding constraint rule based on configuration parameters inputted in the rule configuration interface, where the configuration parameters include but are not limited to: at least one tag name, a tag value corresponding to each tag name, and a logical relationship between the tag name and the corresponding tag value. In some examples, the logical relationship between the tag name and the corresponding tag value includes but is not limited to: equal to, not equal to, including, not including, regular expression, and the like, which is not specifically limited in the embodiments of this disclosure. In some examples, the full-link grayscale release supports multiple constraint rules to take effect at the same time, and supports configuration of priorities for constraint rules. When the same request meets multiple constraint rules at the same time, the constraint rule with a higher priority is matched first.

Further, the display device may display a rule release interface, and associate the generated constraint rule with the environment indicated by the environment ID based on an environment ID inputted in the rule release interface, where the environment ID is a unique ID of the environment. In some examples, the environment ID includes but is not limited to: one or more of letters, symbols, and numbers. Then, the display device may send the generated constraint rule and the association relationship between the constraint rule and the environment to the control plane. By releasing the generated constraint rule to the corresponding environment, the association relationship between the constraint rule and the environment may be established, and then, the environment associated with the constraint rule may be determined based on the constraint rule.

It is to be understood that the embodiments of this disclosure are introduced in a constraint rule matching mode based on a tag form. In some examples, the constraint rule matching mode may further be extended to be based on other forms, such as a host (file) form, a uniform resource locator (URL) form or a cookie (plain text file) form.

In an example, a user creates grayscale release rules (that is, constraint rules) by a Web console, including: the user transmits relevant parameters required for configuring constraint rules to the Web console, and the Web console generates corresponding constraint rules after receiving these relevant parameters. In some examples, creating constraint rules includes but is not limited to: configuring basic information associated with constraint rules (such as rule name), configuring request parameter rules, and releasing destination configuration.

In an example, FIG. 6 is a schematic diagram of a rule configuration interface provided in an embodiment of this disclosure. First, basic setting of constraint rules is performed. As shown in FIG. 6(*a*), the rule name of the constraint rule created by the user may be "lane-test-rule001", and the rule name of the created constraint rule needs to meet specific conditions, for example: Chinese and English characters are supported, and the length of characters does not exceed 60. Of course, the specific conditions that the rule name of the constraint rule needs to meet may also be changed or set. For example, an administrator may change the specific conditions to: the maximum length of characters is 30, only uppercase letters, numbers and separators are included, and the like. In addition, relevant remarks may be made, and the remarks are used for indicating the purpose or function of the created constraint rule. For example, the remark may be "Test".

After the basic setting of constraint rules is completed, request parameter rules may be configured. As shown in FIG. 6(*b*), configuring the request parameter rules includes but is not limited to: configuring a tag name, a tag value, a logical relationship, rule effective conditions, and the like. In some examples, the length of the tag name is at most 32 bytes, and the length of the tag value is at most 128 characters. In some examples, the logical relationship configured when configuring the request parameter rules includes but is not limited to: equal to, not equal to, including, not including, regular expression, and the like. When the logical relationship is configured to be equal to or not equal to, only a single value may be filled in as a tag value; and when the logical relationship is configured to be including and not including, multiple values may be filled in as tag values and separated by English half-width commas. In addition, the rule effective conditions refer to: the foregoing logical relationships, or (meet any logical relationship), and (meet all logical relationships).

As shown in FIG. 6(*b*), the constraint rules may be: aaa is equal to 123, and bbb is not equal to 456. Multiple constraint rules may be provided. In some examples, the tag name is a user-defined tag in a user business. The user-defined tag refers to a tag used in the user business after conversion of a user-defined business parameter. In an example, the source of the user-defined tag includes the following two modes:

Mode 1: Requested parameters are converted into tags through a microservice gateway. For example, through tag plug-ins of the microservice gateway, business parameters included in requested path, query and header are converted into tags.

Mode 2: A user configures tags in codes.

After the basic setting of the constraint rules and the configuration of the request parameter rules, the rules may be released in a target environment. As shown in FIG. 6(*c*), the user may configure a corresponding release destination (target environment) for the configured constraint rules. For example, the target environment is set to "test001", so that the constraint rule with the rule name of "lane-test-rule001" may be associated with the environment with the environment name of "test001".

At step S430, rules are sent.

After the user completes environment creation and constraint rule creation on the Web console, the configured constraint rules may be sent to an object storage service (OSS) control module. A mode of sending the constraint rules may be: the Web console invokes the global routing of the OSS control module to configure an application program interface (API), so as to send full-link constraint rules.

At step S440, rules are sent further.

After the OSS control module receives the full-link constraint rules sent by the Web console, the rules may be reassembled and reconfigured according to the format of a global routing data model of the Service Mesh. The reassembly and reconfiguration may include format conversion. For example, the OSS control module converts the format of the full-link constraint rules into a format that may be understood by the global routing data model of the Service Mesh. Then, the OSS control module invokes a restful API of an apiserver (interface service) module of the control plane of the Service Mesh, so as to send the full-link constraint rules.

In an example, the constraint rules may be sent by the Web console to the apiserver module of the control plane through a Consul (service discovery) module after the constraint rules are configured. In another example, the constraint rules may be sent by the Web console directly to the apiserver module of the control plane after the constraint rules are configured.

At step S450, rules are saved.

After the apiserver module of the control plane of the Service Mesh (Mesh apiserver module for short) obtains the full-link constraint rules sent by the OSS control module, the Mesh apiserver module saves the rules to the Consul module according to the format of the global routing data model of a pilot-discovery (service discovery and configuration) module of the control plane of the Mesh, that is, the Mesh apiserver module converts the format of the full-link constraint rules into a format that may be understood by the global routing data model of the pilot-discovery module of the control plane of the Mesh.

At step S460, addition, modification or deletion of rules are monitored.

When the pilot-discovery module of the control plane of the Service Mesh is started, a persistent connection is established between the pilot-discovery module and the Consul module, and the addition, deletion or modification of full-link constraint rule configuration in the Consul module is monitored.

At step S470. rules are pushed down.

Through the monitoring in step S460, when there is a change in the full-link constraint rules (environment configurations or constraint rules), the Consul module synchronizes the changed content to the pilot-discovery module of the control plane of the Service Mesh in real time in a rule pushing mode.

At step S480, grayscale extension configurations are sent.

After the pilot-discovery module of the control plane of the Service Mesh receives the full-link constraint rules pushed by the Consul module, the full-link constraint rules may be assembled into an xDS grayscale extension configuration format to be sent to the sidecar (agent) of the data plane of the Service Mesh. After the sidecar synchronizes the xDS grayscale extension configurations of the full-link constraint rules, an effect may be taken in real time in the Service Mesh, and grayscale release may be realized according to corresponding release rules.

It is to be understood that in the embodiments of this disclosure, the Web console, the OSS control module and the Consul module may be modules integrated into the same computer device together with the apiserver module and pilot-discovery module of the control plane; and the Web console, the OSS control module and the Consul module may also be external devices that establish communication connections with the apiserver module and pilot-discovery module of the control plane.

In technical solutions provided in embodiments of this disclosure, the environment is associated with the constraint rules by configuring the environment and the constraint rules on the control plane of the Service Mesh; after being configured on the control plane, the environment and the corresponding constraint rules may be synchronized to the data plane, for example, synchronized to the agent (such as sidecar) in the data plane; and the agent of the data plane may perform the corresponding grayscale testing on the traffic request according to the environment and the corresponding constraint rules. Embodiments of this disclosure can realize full-link grayscale release without application awareness, and increase the flexibility of full-link release.

The information processing method provided in this disclosure is introduced below with an exemplary embodiment.

Figure 7:
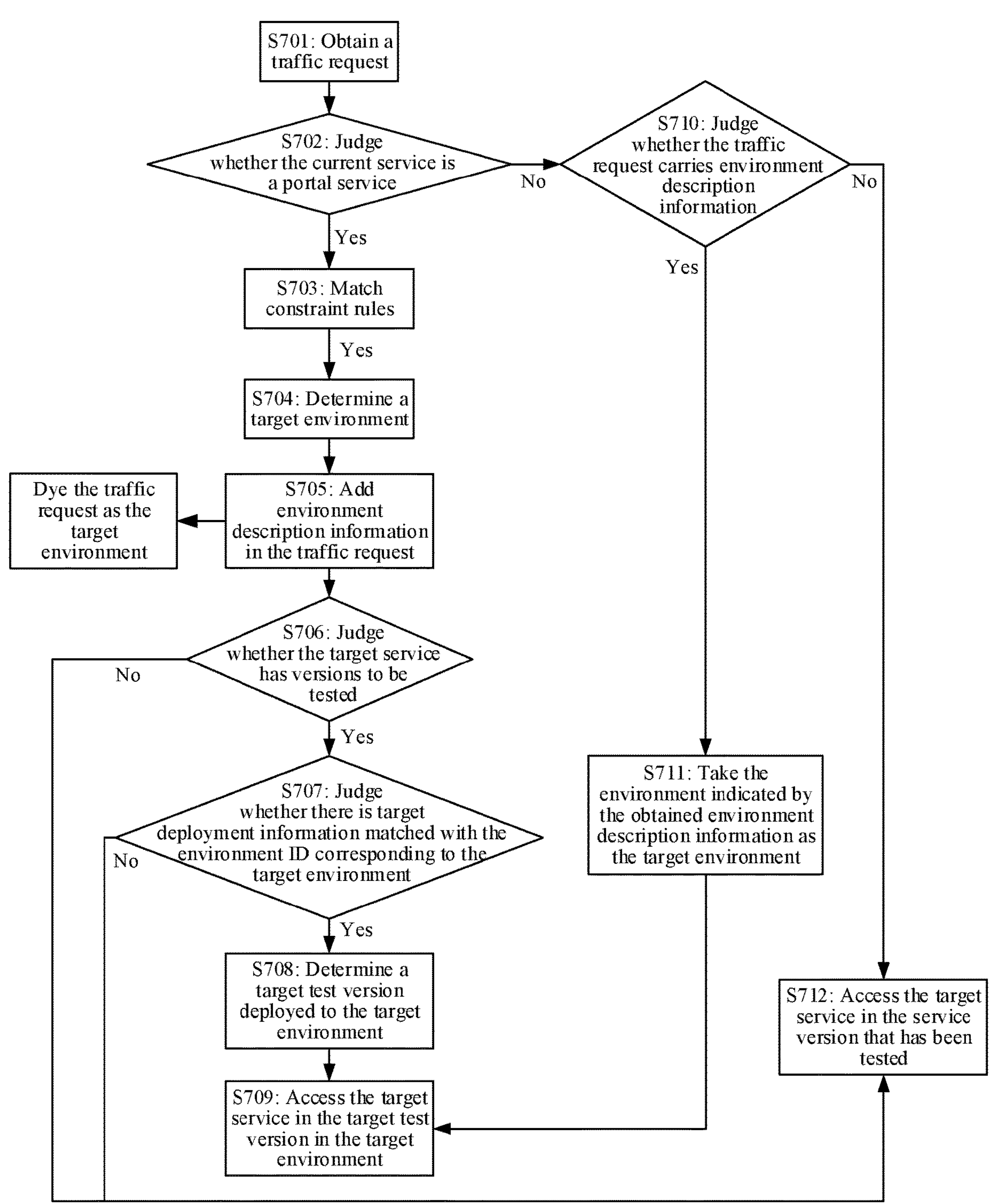
FIG. 7 is a schematic flowchart of another information processing method provided in an embodiment of this disclosure.

FIG. 7 is a schematic flowchart of an information processing method provided in an embodiment of this disclosure. The method may be performed by the foregoing computer device. As shown in FIG. 7, the information processing method may include step S701 to step S712.

At step S701, a traffic request is obtained.

A data plane obtains a traffic request for a target service, the traffic request including a request tag. The request tag includes: at least one tag name, a tag value corresponding to each tag name, and a logical relationship between the tag name and the corresponding tag value. For example, the request tag may be: aaa=123, where "aaa" represents a tag name, 123 represents a tag value corresponding to the tag name, and "=" represents a logical relationship between the tag name and the corresponding tag value.

At step S702, whether the current service is a portal service is judged (determined).

In the embodiment of this disclosure, a mode of judging whether the current service is a portal service includes: deployment information of the current service is determined, and whether the current service is a portal service is determined based on the deployment information. The current service refers to a service currently accessed by the traffic request. The deployment information of the current service includes but is not limited to: a namespace type, a namespace, an application ID, a deployment group, and the like. The deployment information of the portal service includes but is not limited to: a namespace type, a namespace, an application ID, a deployment group, and the like. Therefore, whether the current service is a portal service is determined based on the deployment information of the current service, including: whether the current service belongs to a portal service is determined based on one or more information in the namespace type, the namespace, the application ID, and the deployment group.

If it is determined that the current service is a portal service, step S703 is performed as an initial step; and if it is determined that the current service is not a portal service, step S710 is performed as an initial step.

At step S703, constraint rules are matched.

In a case that the current service is determined to be a portal service, constraint rules may be matched based on the request tag carried by the traffic request. A mode of matching constraint rules includes: a corresponding target constraint rule is matched from a large number of constraint rules based on the request tag carried by the traffic request. In some examples, the matching with the request tag includes: matching with each tag name in the request tag, a tag value corresponding to each tag name, and a logical relationship between each tag name and the corresponding tag value.

In the process of matching constraint rules, multiple constraint rules matched with the request tag may be determined from a constraint rule set. At this time, the constraint rules may be matched according to priorities, and constraint rules with high priorities are matched preferentially. That is, priorities corresponding to multiple constraint rules matched with the request tag are obtained respectively (where the priority corresponding to each constraint rule may be configured by a control plane), and the constraint rule corresponding to the highest priority in multiple priorities is determined as the target constraint rule.

At step S704, a target environment is determined.

After the target constraint rule is determined, the environment associated with the target constraint rule may be used as a target environment matched with the request tag. In this way, portal matching may be performed on the traffic request according to the portal service, and after the portal service is matched, the target environment matched with the request tag is determined according to the environment associated with the portal service. After the portal service and the corresponding constraint rules are matched, a unique environment ID of a global service is automatically generated and maintained, and the environment ID is transferred to a downstream service. Different environments have respective unique environment IDs to avoid the confusion of traffic requests in different environments, thereby ensuring the high efficiency and accuracy of test services.

At step S705, environment description information is added in the traffic request.

After the target environment of the traffic request is determined, the traffic request may be subjected to dyeing treatment. The dyeing treatment refers to adding the environment description information corresponding to the target environment matched with the traffic request to the traffic request, so as to realize marking treatment on the traffic request. For example, the added environment description information includes but is not limited to an environment ID corresponding to the target environment, and the like. In other words, after the environment description information is added to the traffic request, the traffic request is dyed as the target environment, thereby ensuring that the traffic request may only be routed in the target environment, and the subsequent traffic tracing may be facilitated.

At step S706, whether the target service has versions to be tested is judged.

After the environment description information is added to the traffic request, it is necessary to further judge whether the target service has one or more versions to be tested, and the environment to which each version to be tested is deployed.

If the target service has versions to be tested, step S707 is performed; and if the target service does not have any version to be tested, step S712 is performed.

At step S707, whether there is target deployment information matched with the environment ID corresponding to the target environment is judged.

If the target service has one or more versions to be tested, whether there is target deployment information matched with the environment ID corresponding to the target environment is judged. If any version to be tested of the target service is not deployed to the target environment, the target service in the service version that has been tested is accessed (that is, step S712 is performed).

At step S708, a target test version deployed to the target environment is determined.

A target test version that is deployed to the target environment in the versions to be tested is determined based on the environment to which the versions to be tested of the target service are deployed. For example, assuming that the target service B has two versions to be tested: a version V1 to be tested and a version V2 to be tested, where the version V1 to be tested is deployed to an environment 1, and the version V2 to be tested is deployed to an environment 2. Assuming that the target environment is the environment 1, it can be determined that the target test version deployed to the target environment is the version V1 to be tested.

At step S709, the target service in the target test version in the target environment is accessed.

After the target test version is determined in step S708, the target service in the target test version is accessed in the target environment.

At step S710, whether the traffic request carries environment description information is judged.

When it is determined that the current service is not a portal service through step S702, environment description information is obtained from the traffic request, where the environment description information is added after the environment matched with the request tag in the traffic request is determined. Then, the traffic request is routed based on the obtained result of the environment description information.

If it is judged that the traffic request carries the environment description information (that is, the environment description information may be obtained), step S711 is performed; and if it is judged that the traffic request does not carry the environment description information (that is, the environment description information may not be obtained), step S712 is performed.

At step S711, the environment indicated by the obtained environment description information is taken as the target environment.

If the environment description information is obtained from the traffic request, the environment indicated by the obtained environment description information is taken as the target environment. Then, step S709 is performed.

At step S712, the target service in the service version that has been tested is accessed.

If the environment description information is not obtained from the traffic request, it is determined that the target service does not have a version to be tested or any version to be tested is not deployed to the target environment (deployed to other environments except the target environment), so as to access the target service in the service version that has been tested.

Technical solutions provided in embodiments of this disclosure may uniformly manage traffic requests based on request tags, and may flexibly route the traffic requests to different environments. Furthermore, the data plane of the Service Mesh implements the definition and delivery of traffic requests based on a global routing mode, and may perform full-link grayscale release without application awareness. Users may only need to pay attention to how to define traffic requests and partition environments, and the cost of understanding and operation is low. In addition, embodiments of this disclosure can realize the policy control between multiple constraint rules and multiple environments, and flexibly adapt to various complex grayscale release scenes by isolating multiple non-interfering different environments. Finally, the data plane can independently realize the global routing to control full-link grayscale release, realize complete isolation from common routing rules, preferentially matches the global routing, and may not be disturbed by the common routing rules.

Figure 8:
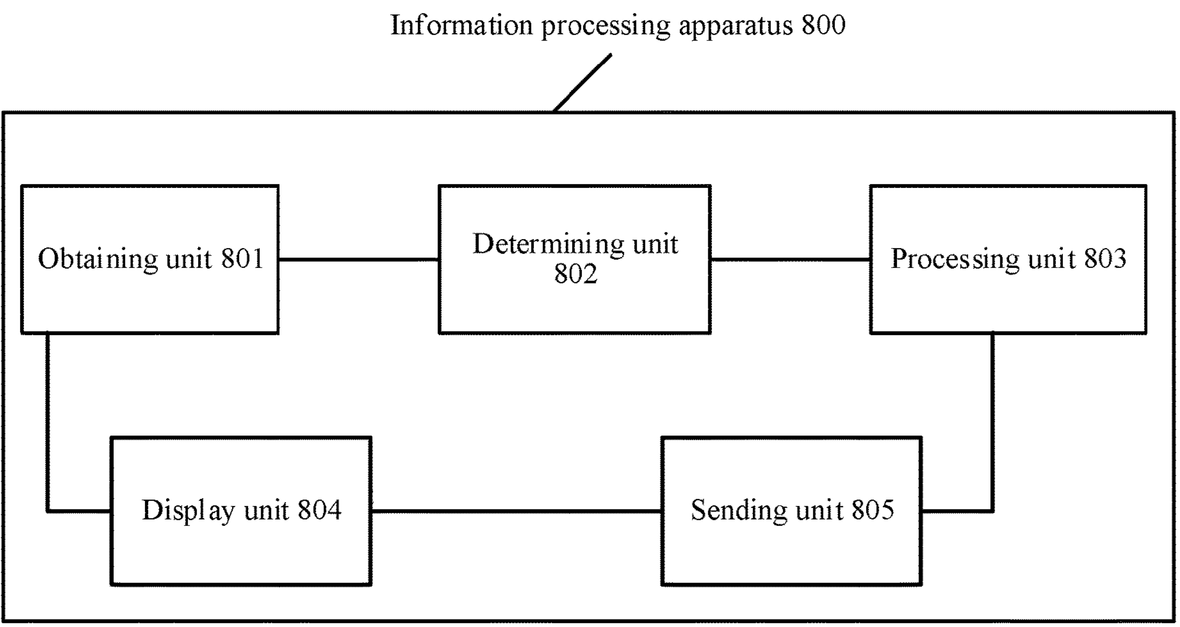
FIG. 8 is a schematic structural diagram of an information processing apparatus provided in an embodiment of this disclosure.

FIG. 8 is a schematic structural diagram of an information processing apparatus provided in an embodiment of this disclosure. The information processing apparatus 800 may be applied to the computer device in the method embodiments shown in FIG. 2, FIG. 4 and FIG. 7. The information processing apparatus 800 may be a computer program (including program codes) running in a lightweight node. For example, the information processing apparatus 800 is an application software. The information processing apparatus 800 is configured to perform corresponding steps in the methods provided in the embodiments of this disclosure. The information processing apparatus 800 includes: an obtaining unit 801, a determining unit 802, and a processing unit 803. One or more modules, submodules, and/or units of the apparatus can be implemented by processing circuitry, software, or a combination thereof, for example.

The obtaining unit 801 is configured to obtain a traffic request for a target service, the traffic request including a request tag.

The determining unit 802 is configured to determine a target environment matched with the request tag.

The obtaining unit 801 is further configured to obtain deployment information of the target service, the deployment information of the target service being used for indicating the following information: whether the target service has versions to be tested, whether each version to be tested is deployed to a corresponding environment, and a corresponding environment ID after each version to be tested is deployed to the corresponding environment.

The processing unit 803 is configured to determine a target test version that is deployed to the target environment in the versions to be tested in a case that the target service has the versions to be tested according to the deployment information of the target service, and access the target service in the target test version in the target environment.

In a possible implementation, when determining a target environment matched with the request tag, the determining unit 802 is further configured to:

obtain a constraint rule set, the constraint rule set including at least one constraint rule, and each constraint rule being associated with an environment; and determine a target constraint rule matched with the request tag in the at least one constraint rule, and take the environment associated with the target constraint rule as the target environment.

In a possible implementation, any constraint rule in the constraint rule set is synchronously obtained from a control plane of a Service Mesh. The information processing apparatus 800 further includes: a display unit 804 and a sending unit 805.

The display unit 804 is configured to display a rule configuration interface, and generate a constraint rule based on configuration parameters inputted in the rule configuration interface.

The display unit 804 is further configured to display a rule release interface, and associate the constraint rule with the environment indicated by the environment ID based on an environment ID inputted in the rule release interface.

The sending unit 805 is configured to send the generated constraint rule and the association relationship between the generated constraint rule and the associated environment to a control plane.

In a possible implementation, when determining a target environment matched with the request tag, the determining unit 802 is further configured to:

determine deployment information of the current service, the current service referring to the service currently accessed by the traffic request;

determine whether the current service is a portal service based on the deployment information of the current service; and perform the step of determining a target constraint rule matched with the request tag in the at least one constraint rule in a case that the current service is the portal service.

In a possible implementation, the target service has a service version that has been tested. The determining unit 802 is further configured to perform the following operations:

obtain environment description information from the traffic request when determining that the current service is not the portal service, where the environment description information is added after determining the environment matched with the request tag in the traffic request; and route the traffic request according to the environment description information obtained from the traffic request.

In a possible implementation, when routing the traffic request according to the environment description information obtained from the traffic request, the determining unit 802 is further configured to:

take the environment indicated by the obtained environment description information as the target environment if the environment description information is obtained from the traffic request, and take a test version for the target service deployed in the target environment as the target test version, so as to access the target service in the target test version in the target environment; and determine that the target service does not have a version to be tested or any version to be tested is not deployed to the target environment if the environment description information is not obtained from the traffic request, so as to access the target service in the service version that has been tested.

In a possible implementation, the request tag includes: at least one tag name, a tag value corresponding to the tag name, and a logical relationship between the tag name and the tag value; and the matching with the request tag includes: matching with the at least one tag name, the tag value corresponding to the tag name, and the logical relationship.

In a possible implementation, a version to be tested is deployed to an environment, and the deployment information of the target service in the version to be tested includes: an environment ID corresponding to the environment to which the version to be tested is deployed. When determining a target test version that is deployed to the target environment in the versions to be tested, the processing unit 803 is further configured to:

determine target deployment information matched with the environment ID corresponding to the target environment based on the deployment information of the target service in the version to be tested; and take the version to be tested corresponding to the target deployment information as the target test version.

In a possible implementation, the target service has a service version that has been tested. In a case that any version to be tested of the target service is deployed to other environments except the target environment, the processing unit 803 accesses the target service in the service version that has been tested; and in a case that any version to be tested of the target service is not deployed to any environment, the processing unit 803 accesses the target service in the version to be tested.

After a traffic request for a target service is obtained, a target environment matched with a request tag carried by the traffic request is determined; and based on deployment information of the target service, a target test version that is deployed to the target environment in the versions to be tested of the target service is determined, so as to access the target service in the target test version in the target environment. In the embodiments of this disclosure, by deploying the versions to be tested of the target service to different environments, isolation and non-interference between different versions to be tested are realized due to mutual isolation of different environments, this disclosure may flexibly adapt to various complex and complicated grayscale release scenes in different versions to be tested for services, the configuration of services during grayscale testing is effectively avoided, and the efficiency of grayscale testing is increased. In addition, the embodiments of this disclosure may also uniformly manage traffic requests based on request tags, and may flexibly route the traffic requests to different environments, so as to further increase the efficiency of grayscale testing.

Figure 9:
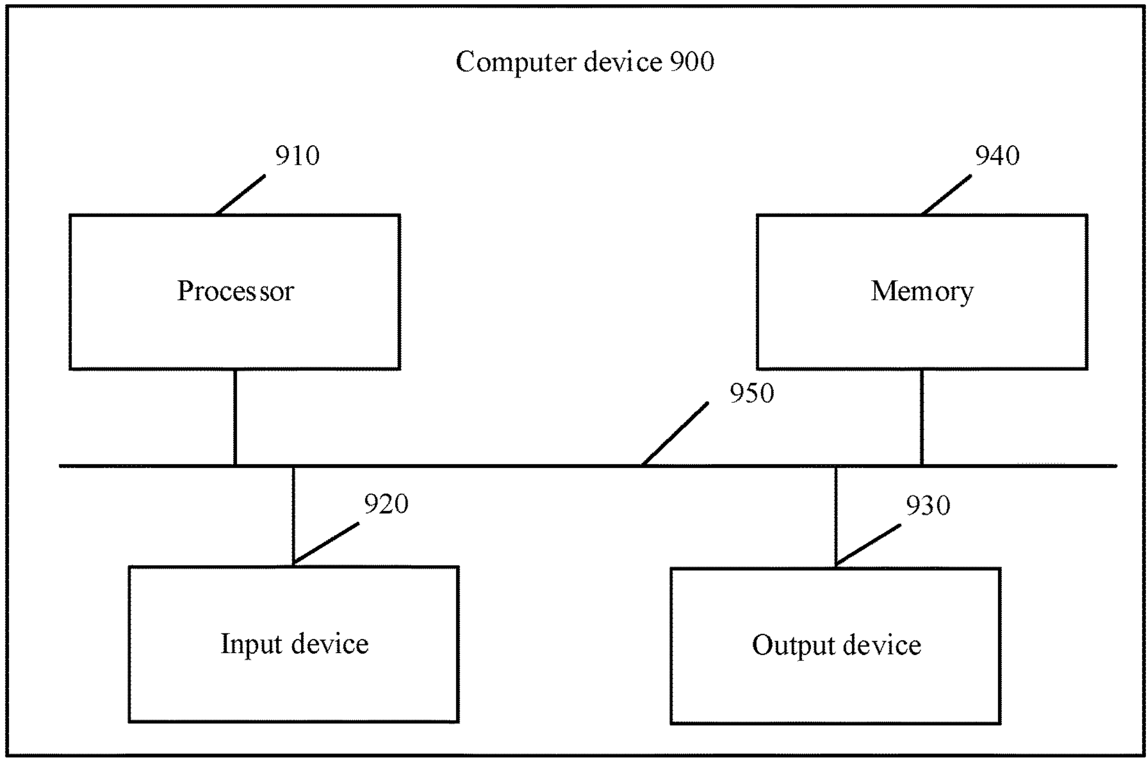
FIG. 9 is a schematic structural diagram of a computer device provided in an embodiment of this disclosure.

FIG. 9 is a schematic structural diagram of a computer device provided in an embodiment of this disclosure. The computer device 900 is configured to perform the steps performed by the computer device in the method embodiments corresponding to FIG. 2, FIG. 4 and FIG. 7. The computer device 900 includes: one or more processors 910, one or more input devices 920, one or more output devices 930, and a memory 940 (e.g., a non-transitory computer-readable storage medium). The processor 910, the input device 920, the output device 930 and the memory 940 are connected through a bus 950. The memory 940 is configured to store a computer program, the computer program includes program instructions, and the processor 910 is configured to invoke the program instructions stored in the memory 940 to perform the information processing methods in the embodiments corresponding to FIG. 2 to FIG. 7.

It is to be understood that the computer device described in the embodiments of this disclosure may perform the description of the information processing methods in the embodiments corresponding to FIG. 2 to FIG. 7, and may also perform the description of the information processing apparatus 800 in the embodiment corresponding to FIG. 8, which will not be repeated here. In addition, the descriptions of beneficial effects of the same method are not described herein again.

In addition, it is to be noted that an embodiment of this disclosure further provides a computer storage medium, the computer storage medium stores the computer program executed by the aforementioned information processing apparatus 800, and the computer program includes program instructions. When executing the foregoing program instructions, the processor may perform the methods in the embodiments corresponding to FIG. 2, FIG. 4 and FIG. 7, which will not be repeated here. For technical details that are not disclosed in the computer storage medium embodiments of this disclosure, refer to the descriptions of the method embodiments of this disclosure. As an example, the program instructions may be executed on a computer device, on multiple computer devices at the same location, or on multiple computer devices which are distributed in multiple locations and interconnected by using a communication network. Multiple computer devices which are distributed in multiple locations and interconnected by using a communication network may form a blockchain system.

According to one aspect of this disclosure, a computer program product or a computer program is provided. The computer program product or the computer program includes computer instructions, and the computer instructions are stored in a computer-readable storage medium. A processor of a computer device reads the computer instructions from the computer-readable storage medium, and the processor executes the computer instructions, so that the computer device may perform the methods in the embodiments corresponding to FIG. 2, FIG. 4 and FIG. 7, which will not be repeated here.

A person of ordinary skill in the art may understand that all or some of the processes of the methods in the foregoing embodiments may be implemented by a computer program instructing relevant hardware. The foregoing program may be stored in a computer-readable storage medium, such as a non-transitory computer-readable storage medium. When the program is executed, the processes of the foregoing method embodiments may be performed. The foregoing storage medium may be a magnetic disc, an optical disc, a read-only memory (ROM), a random access memory (RAM), or the like.

What is disclosed above is merely exemplary embodiments of this disclosure, and is not intended to limit the scope of the claims of this disclosure. Therefore, equivalent variations made in accordance with the claims of this disclosure shall fall within the scope of this disclosure.

What is claimed is:

1. A method for information processing, the method comprising:

obtaining a set of constraint rules based on a user input through an input device and a configuration interface displayed on a display:

obtaining a traffic request to access a target application service, the traffic request including a request tag, the request tag including at least a tag name, a tag value corresponding to the tag name, and a logical relationship between the tag name and the corresponding tag value;

determining, by processing circuitry, whether a current application service is an environment portal service based on second deployment information of the current application service, the current application service being currently accessed by the traffic request, the second deployment information of the current application service including at least one of name, type, application ID, or deployment group; and when the current application service is the environment portal service, determining, by the processing circuitry, a target application service environment based on matching the request tag against the set of constraint rules, the target application service environment corresponding to a network of application services implemented by execution of one or more software programs;

updating the traffic request to include environment description information identifying the target application service environment;

obtaining first deployment information of the target application service, the first deployment information of the target application service indicating one or more test versions of the target application service to be tested and one or more corresponding application service environments respectively deployed for the one or more test versions of the target application service;

determining, by the processing circuitry, a target test version from the one or more test versions to be accessed by the traffic request, when the target test version is deployed to the target application service environment; and routing the updated traffic request that includes the environment description information through one or more intermediate application services to provide access to the determined target application service in the target test version.

2. The method according to claim 1, wherein the set of constraint rules includes one or more constraint rules, each one of the one or more constraint rules being associated with a respective one of one or more candidate application service environments, and the determining the target application service environment includes:

determining a target constraint rule from the set of constraint rules, the target constraint rule matching with the request tag; and determining one of the one or more candidate application service environments associated with the target constraint rule as the target application service environment.

3. The method according to claim 2, further comprising:

determining the second deployment information of the current application service that is currently accessed by the traffic request;

determining whether the current application service is the environment portal service based on the second deployment information of the current application service; and determining the target constraint rule from the set of constraint rules when the current application service is the environment portal service.

4. The method according to claim 2, wherein the determining the target application service environment comprises:

determining the target application service environment based on one or more of the tag name, the tag value corresponding to the tag name, and the logical relationship.

5. The method according to claim 2, further comprising:

displaying the configuration interface;

generating a newly input constraint rule based on configuration parameters inputted through the configuration interface;

displaying a rule release interface; and associating the newly input constraint rule with a candidate application service environment indicated by an environment identity (ID) inputted through the rule release interface.

6. The method according to claim 1, wherein a first test version of the target application service to be tested is deployed to a first application service environment, the first deployment information of the target application service includes an environment identity (ID) corresponding to the specific application service environment to which the first test version is deployed, and the determining the target test version includes:

determining that the environment ID corresponding to the first application service environment matches the environment ID corresponding to the target application service environment; and determining the first test version as the target test version.

7. The method according to claim 1, wherein the target application service has a tested version that has been tested, and the method further includes:

providing access to the target application service in the tested version when none of the one or more test versions is deployed to the target application service environment; or providing access to the target application service in a default test version of the one or more test versions when none of the one or more test versions is deployed to any application service environment.

8. An apparatus for information processing, comprising:

processing circuitry configured to:

obtain a set of constraint rules based on a user input through an input device and a configuration interface displayed on a display;

obtain a traffic request to access a target application service, the traffic request including a request tag, the request tag including at least a tag name, a tag value corresponding to the tag name, and a logical relationship between the tag name and the corresponding tag value;

determine whether a current application service is an environment portal service based on second deployment information of the current application service, the current application service being currently accessed by the traffic request, the second deployment information of the current application service including at least one of name, type, application ID, or deployment group; and when the current application service is the environment portal service, determine a target application service environment based on matching the request tag against the set of constraint rules, the target application service environment corresponding to a network of application services implemented by execution of one or more software programs;

update the traffic request to include environment description information identifying the target application service environment;

obtain first deployment information of the target application service, the first deployment information of the target application service indicating one or more test versions of the target application service to be tested and one or more corresponding application service environments respectively deployed for the one or more test versions of the target application service;

determine a target test version from the one or more test versions to be accessed by the traffic request, when the target test version is deployed to the target application service environment; and route the updated traffic request that includes the environment description information through one or more intermediate application services to provide access to the determined target application service in the target test version.

9. The apparatus according to claim 8, wherein the set of constraint rules includes one or more constraint rules, each one of the one or more constraint rules being associated with a respective one of one or more candidate application service environments, and the processing circuitry is configured to:

determine a target constraint rule from the set of constraint rules, the target constraint rule matching with the request tag; and determine one of the one or more candidate application service environments associated with the target constraint rule as the target application service environment.

10. The apparatus according to claim 9, wherein the processing circuitry is configured to:

determine the second deployment information of the current application service that is accessed currently by the traffic request;

determine whether the current application service is the environment portal service based on the second deployment information of the current application service; and determine the target constraint rule from the set of constraint rules when the current application service is the environment portal service.

11. The apparatus according to claim 9, wherein the processing circuitry is configured to:

determine the target application service environment that matches with one or more of the tag name, the tag value corresponding to the tag name, and the logical relationship.

12. The apparatus according to claim 9, wherein the processing circuitry is configured to:

display the configuration interface;

generate a newly input constraint rule based on configuration parameters inputted through the configuration interface;

display a rule release interface; and associate the newly input constraint rule with a candidate application service environment indicated by an environment identity (ID) inputted through the rule release interface.

13. The apparatus according to claim 8, wherein a first test version of the target application service to be tested is deployed to a first application service environment, the first deployment information of the target application service includes an environment identity (ID) corresponding to the first application service environment to which the first test version is deployed, and the processing circuitry is configured to:

determine that the environment ID corresponding to the first application service environment matches the environment ID corresponding to the target application service environment; and determine the first test version as the target test version.

14. The apparatus according to claim 8, wherein the target application service has a tested version that has been tested, and the processing circuitry is configured to:

provide access to the target application service in the tested version when none of the one or more test versions is deployed to the target application service environment; or provide access to the target application service in a default test version of the one or more test versions when none of the one or more test versions is deployed to any application service environment.

15. A non-transitory computer-readable storage medium storing instructions which, when executed by at least one processor, cause the at least one processor to perform a method for information processing, the method comprising:

obtaining a set of constraint rules based on a user input through an input device and a configuration interface displayed on a display:

obtaining a traffic request to access a target application service, the traffic request including a request tag, the request tag including at least a tag name, a tag value corresponding to the tag name, and a logical relationship between the tag name and the corresponding tag value;

determining whether a current application service is an environment portal service based on second deployment information of the current application service, the current application service being currently accessed by the traffic request, the second deployment information of the current application service including at least one of name, type, application ID, or deployment group; and when the current application service is the environment portal service, determining a target application service environment based on matching the request tag against the set of constraint rules, the target application service environment corresponding to a network of application services implemented by execution of one or more software programs;

updating the traffic request to include environment description information identifying the target application service environment;

obtaining first deployment information of the target application service, the first deployment information of the target application service indicating one or more test versions of the target application service to be tested and one or more corresponding application service environments respectively deployed for the one or more test versions of the target application service;

determining a target test version from the one or more test versions to be accessed by the traffic request, when the target test version is deployed to the target application service environment; and routing the updated traffic request that includes the environment description information through one or more intermediate application services to provide access to the determined target application service in the target test version.

16. The non-transitory computer-readable storage medium according to claim 15, wherein the set of constraint rules includes one or more constraint rules, each one of the one or more constraint rules being associated with a respective one of one or more candidate application service environments, and-environment;

the determining the target application service environment includes:

determining a target constraint rule from the set of constraint rules, the target constraint rule matching with the request tag; and determining one of the one or more candidate application service environments associated with the target constraint rule as the target application service environment.

17. The non-transitory computer-readable storage medium according to claim 16, wherein the method comprises:

determining the second deployment information of the current application service that is accessed currently by the traffic request;

determining whether the current application service is the environment portal service based on the second deployment information of the current application service; and determining the target constraint rule from the set of constraint rules when the current application service is the environment portal service.

18. The non-transitory computer-readable storage medium according to claim 16, wherein the determining the target application service environment comprises:

determining the target application service environment based on one or more of the tag name, the tag value corresponding to the tag name, and the logical relationship.

19. The non-transitory computer-readable storage medium according to claim 16, wherein the method comprises:

displaying the configuration interface;

generating a newly input constraint rule based on configuration parameters inputted through the configuration interface;

displaying a rule release interface; and associating the newly input constraint rule with a candidate application service environment indicated by an environment identity (ID) inputted through the rule release interface.

20. The non-transitory computer-readable storage medium according to claim 15, wherein a first test version of the target application service to be tested is deployed to a first application service environment, the first deployment information of the target application service includes an environment identity (ID) corresponding to the first application service environment to which the first test version is deployed, and the determining the target test version includes:

determining that the environment ID corresponding to the first application service environment matches the environment ID corresponding to the target application service environment; and determining the first test version as the target test version.

* * * * *